United States Patent [19]

Bemmels et al.

[11] 4,125,665

[45] Nov. 14, 1978

[54] CONTAINER SEALING TAPE

[75] Inventors: Cyrus W. Bemmels, North Brunswick; Richard A. Mumber; Thomas J. Schirripa, both of Edison, all of N.J.

[73] Assignee: Johnson & Johnson, New Brunswick, N.J.

[21] Appl. No.: 828,402

[22] Filed: Aug. 29, 1977

[51] Int. Cl.² ............... B32B 15/08; B32B 15/20; B32B 27/36; B32B 27/32
[52] U.S. Cl. ................... 428/352; 220/359; 428/354; 428/355; 428/458; 428/462; 428/906
[58] Field of Search ............. 220/359; 428/483, 458, 428/462, 906, 352, 343, 354–356

[56] References Cited

U.S. PATENT DOCUMENTS

| | | | |
|---|---|---|---|
| 3,092,250 | 6/1963 | Knutson et al. | 428/462 X |
| 3,129,816 | 4/1964 | Bond et al. | 428/483 X |
| 3,152,950 | 10/1964 | Palmquist et al. | 428/462 X |
| 3,389,827 | 6/1968 | Abere et al. | 220/359 |
| 3,679,458 | 7/1972 | Sorell et al. | 428/352 |
| 3,740,366 | 6/1973 | Sanderson et al. | 428/352 X |
| 3,776,805 | 12/1973 | Hansen | 428/458 X |
| 3,949,134 | 4/1976 | Willdorf | 428/483 X |

Primary Examiner—Harold Ansher

[57] ABSTRACT

A linerless pressure-sensitive adhesive container sealing tape which comprises a backing laminate, a unique pressure-sensitive adhesive layer on one of the major surfaces of the laminate and a release coating on the other major surface of the laminate. The tape is wound upon itself to form a roll with the pressure-sensitive adhesive layer facing inwardly toward the axis of the roll. The backing preferably comprises a first polyester film, a thin layer of metal coated onto one major surface of said first film to metallize this surface, a second polyester film, and a laminating adhesive layer adhering the second film to the metallized surface of the first film. The pressure-sensitive adhesive layer consists of an adhesive composition based upon a mixture of S-I-S and S-B-S linear or radial thermoplastic and elastomeric block copolymers wherein the S-blocks are thermoplastic and are derived from styrene or styrene homologues and the I-blocks and B-blocks are elastomeric and derived from isoprene and butadiene, respectively, together with a relatively high melting point tackifier resin and a relatively low molecular weight S-block associating bonding resin.

8 Claims, 3 Drawing Figures

CONTAINER SEALING TAPE

BACKGROUND OF THE INVENTION

The present invention relates to pressure-sensitive adhesive container or can sealing tapes, particularly to such tapes which are adapted to be die-cut and applied as peel-open tabs over corresponding holes die-cut in the tops of juice cans, for example. Such tapes have been proposed with backings of metal foil or metallized polyester film and the latter has achieved substantial commercial acceptance.

Metallized polyester film backed pressure-sensitive adhesive tapes have been used for a number of years for sealing die-cut holes in the tops of juice cans as indicated above. Tape of this type currently being supplied to can manufacturers consists of the following components: a 2-mil thick polyester film, a layer of metallization vacuum deposited on one of the major surfaces of the polyester film, a protective coating applied over the metallization to protect the metallization from oxidation or corrosion by acid, a pressure-sensitive adhesive layer applied over a thin primer coating anchoring the adhesive to the other major surface of the polyester film, and a silicone-coated paper release liner applied to the free surface of the adhesive to allow the tape to be wound into a roll. This release liner is removed from the tape structure just as it is introduced to a die cutting machine which sequentially cuts the tab and applies it properly-positioned to the die-cut hole in the can lid.

This tape structure requires a multitude of steps in its production, is difficult to make, and is subject to high waste. After metallization, the polyester film must be primed on one side and then the protective coating must be applied over the metallization on the other side of the film. The adhesive is coated on the silicone liner, dried and then laminated to the primed surface of the polyester backing film. The bond between the primer and the adhesive does not develop immediately and the tape must be stored a month or two in order to provide a good bond between adhesive and primer. Finally, the liner must be removed to allow the tape to be used, and then it must be disposed of. This type of tape is described in U.S. Pat. No. 3,389,827.

Past efforts to provide a linerless tape have been fraught with many problems and disappointments. It has been impossible to produce a product with a consistently good release and barrier coating over the metallization. The metallization has a tendency to pick-off and thereby delaminate, particularly when a heavy metallized layer is applied.

THE INVENTION

We have invented a new linerless container or can sealing tape which is lower in cost, consistent in quality, easier to make and easier for the can manufacturer to use. For instance, he no longer has the problem of handling and disposing of thousands of yards of silicone-coated liner in bulky ribbon form.

The linerless container or can sealing tape of our invention comprises a backing laminate, a unique pressure-sensitive adhesive layer on one of the major surfaces of the laminate and a release coating on the opposite major surface of the laminate. The tape is wound upon itself to form a roll with the pressure-sensitive adhesive layer facing inwardly toward the axis of the roll. The backing laminate comprises a first polyester film and a second polyester film laminated to one another through a reflective inner layer which comprises either, a thin layer of metal coated onto one major surface of the first film to metallize said surface and a laminating adhesive layer adhering the second film to the metallized surface of the first film, or a laminating adhesive layer containing metallic reflective material and adhering the first and second films to one another.

The pressure-sensitive adhesive layer of our invention is uniquely adapted to provide high performance on the container or can lid and at the same time assure excellent bonding directly to the polyester backing, thereby eliminating the need for a primer between the adhesive and the backing. This adhesive layer consists essentially of the following components, the proportions of which are expressed in parts per one hundred parts by weight of the elastomeric component:

(1) an elastomeric component comprising about 35-65 parts of each of S-I-S and S-B-S linear or radial thermoplastic and elastomeric block copolymers wherein the S-blocks are thermoplastic and are derived from styrene or styrene homologues and the I-blocks and the B-blocks are elastomeric and are derived from isoprene and butadiene, respectively;

(2) about 20-50 parts of a relatively high melting point tackifier resin; and (3) about 10-35 parts of a relatively low molecular weight S-block associating bonding resin.

In the adhesive of this invention, optimum performance may be provided by using approximately equal proportions of the S-I-S and S-B-S block copolymers in the polymer mixture. However, excellent results may be obtained when proportions of ingredients are maintained approximately within the following ranges with all proportions being expressed in parts per one hundred parts by weight of the elastomeric component.

| Ingredient | Proportion |
| --- | --- |
| S-I-S copolymer | 35-65 |
| S-B-S copolymer | 65-35 |
| Tackifier resin | 20-50 |
| Bonding resin | 10-35 |
| Antioxidants | 1-3 |

The linear or radial S-I-S and S-B-S block copolymers of this invention are of the type which consists of S-blocks derived, i.e. polymerized or copolymerized, from styrene or styrene homologues; I-blocks derived from Isoprene; and B-blocks derived from butadiene. Small proportions of other monomers also may enter into the block copolymers themselves. The individual S-blocks have a number average molecular weight of at least about 6,000, preferably in the range of about 8,000-30,000, and the S-blocks constitute about 5-50 percent, preferably about 10-30 percent, by weight of the block copolymer. The number average molecular weight of the I-blocks or the B-blocks for linear S-I-S or S-B-S block copolymers preferably is in the range of about 45,000-180,000 and that of the linear copolymer, itself, preferably is in the range of about 75,000-200,000. The number average molecular weight of corresponding radial block copolymers preferably is in the range of about 125,000-400,000. The designations S-I-S and S-B-S include what are sometimes called A-B-C block copolymers wherein the end blocks are different from one another but both are derived from styrene or styrene homologues. This applies both to linear and radial block copolymers. The term "linear block copolymer"

(or copolymers) includes branched copolymers as well as unbranched copolymers.

The radial S-I-S and S-B-S polymers useful in this invention are of the type described in U.S. Pat. No. 3,281,383 and conform to the following general formula: $(A-B)_nX$, wherein A is a thermoplastic block polymerized from styrene or styrene homologues, B is an elastomeric block derived from isoprene or butadiene, X is an organic or inorganic connecting molecule with a functionality of 2-4 as described in U.S. Pat. No. 3,281,383 or possibly with a higher functionality as described in the article entitled "New Rubber is Backed by Stars" appearing on page 35 of the June 11, 1975 issue of Chemical Week. "n" then is a number corresponding to the functionality of X.

The elastomeric component of the film forming composition of this invention may include small amounts of other block copolymers, as well as more conventional elastomers but these should not exceed about 25 percent by weight of the elastomeric component. These other elastomers may include, highly broken down natural rubbers and butadiene-styrene random copolymer rubbers, butyl rubbers and the like. Potentially elastomeric liquid polymers also may be employed as additives but normally in lower proportions not above about 10 percent by weight of the elastomeric component. The other block copolymers may include simple A-B copolymers as well as A-B-A copolymers.

The tackifier resin component of the adhesive of this invention should be based on a relatively high melting point tackifier resin, such as Wingtack 95 solid hydrocarbon resin, or Piccolyte S-115 solid polyterpene resin. In any event the tackifier employed should have a melting point of at least about 90° C.

The bonding resin of our adhesive consists essentially of low molecular weight resins which are adapted to associate principally with, and are principally compatible with, the S-blocks of the block copolymers. These include low molecular weight resins based on alpha-methylstyrene-vinyl toluene copolymers and coumarone-indene copolymers. Preferred resins for this purpose possess a number average molecular weight not above about 3,000 although higher molecular weight resins in the low molecular weight range also may be employed.

Relatively small proportions of colorants, tinting agents, pigments, fillers or extenders, and the like, also may be added to the adhesive of this invention and, as indicated hereinbefore, antioxidants, heat stabilizers and the like normally are employed. Typical antioxidants are 2,5-ditertiary amyl hydroquinone, ditertiary butyl cresol, beta meta cresol, zinc dibutyl dithiocarbamate, and the like.

Other and further advantages of this invention will be apparent to one skilled in the art from the following description, examples and claims, taken together with the drawings wherein:

Figure 1:
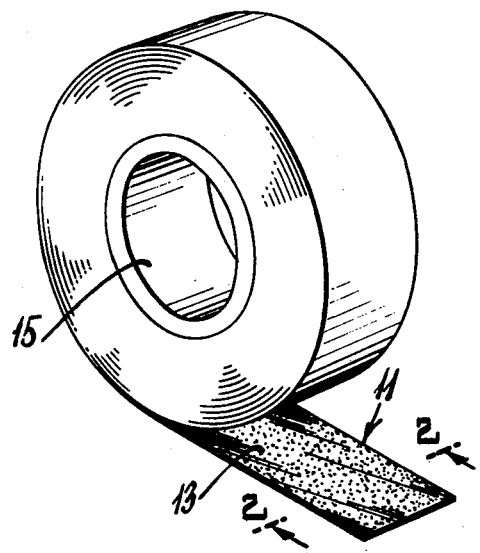
FIG. 1 is a view in perspective of a roll of container sealing tape according to this invention.
Figure 2:
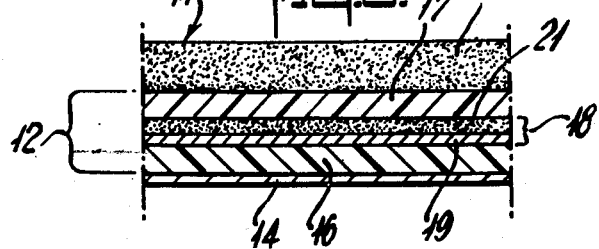
FIG. 2 is an enlarged partial sectional view taken along the line 2—2 of FIG. 1.
Figure 3:
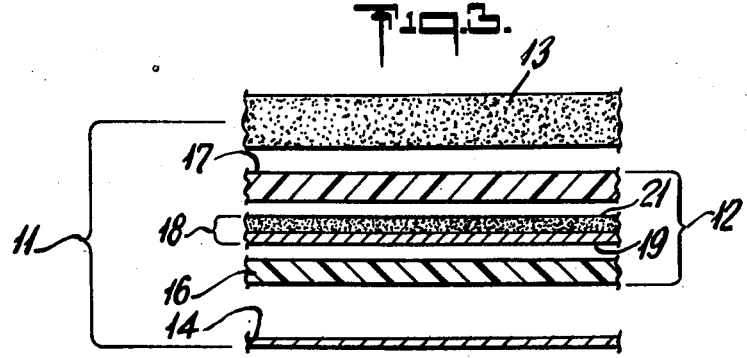
FIG. 3 is an exploded view of the section of FIG. 2.

Referring to the drawings, there is shown a roll of pressure-sensitive adhesive container or can sealing tape 11 according to this invention, wherein the tape 11 comprises a backing laminate 12, a layer of pressure-sensitive can sealing adhesive 13 and a release coating 14. The tape roll is formed by winding the tape 11 upon itself around a hollow cylindrical core 15 with the adhesive layer 13 facing inwardly toward the core and the axis of the roll. The release coating 14, in turn, faces outwardly away from the axis of the roll and presents the surface which contacts the inwardly facing adhesive layer 13 between each convolution of the roll.

The backing laminate 12 comprises a first polyester film 16 and a second polyester film 17 laminated to one another through a reflective inner layer 18. The reflective inner layer 18, in turn, comprises a thin layer 19 of metallization which is coated onto one major surface of the first polyester film 16 to metallize said surface, and a laminating adhesive layer 21 adhering the second polyester film 17 to the first film 16 through the layer of metallization 19.

In a preferred tape according to this invention, the backing laminate consists of a 1-mil thick polyethylene terephthalate first film 16 having a very thin vacuum deposited layer of metallization 17 applied to its inner surface. This metallized first film then is bonded to a 1-mil thick polyethylene terephthalate second film 19 through a hot melt bonding adhesive layer 18 which is based upon a polyester resulting from the esterification of ethylene glycol and mixed phthallic acids such as terephthallic, metaphthallic or orthophthallic acids. In this type of construction the preferred weight of the hot melt adhesive is 0.05 to 0.20 ozs./sq. yd., but higher weights of adhesive may be used. Other film thicknesses may be used, but the canning industry has employed a 2-mil thick polyester-backed tape and it, therefore, is desirable to use a composite, the overall thickness of which is approximately 2-2.5 mils. This tape has the proper rigidity to handle well on the die cutting and applicator equipment currently in use. The metallized polyester side of the laminate appears somewhat glossier than the polyester adhesive side and, therefore, is the preferred outside surface (that opposite the pressure-sensitive adhesive layer 13). However, the opposite surface may be used if high gloss is not required by the canner. This laminate of this invention has substantially the same tensile and elongation properties as the 2-mil polyester construction of the prior art, but the tape of our invention surprisingly exhibits a marked improvement in puncture resistance and tear resistance. This is a great advantage to the ultimate consumer since it provides added safety against puncturing of sealed cans and gives added insurance against tearing of the tape tab on removal. In addition, the polyester film covering the metallization provides the ultimate protection against oxidation or corrosion of the metallized surface which is extremely thin and easily is etched away by canning acids if not protected.

A pressure-sensitive adhesive may be used as an alternate laminating adhesive. However, in this case, a somewhat higher weight of adhesive should be used, i.e., 0.5-1.0 oz./sq. yd. If a colored metallized tape is desired, the outer film or the polyester adhesive may be tinted, thus assuring both the high gloss of the metallization and any tint desired. If gloss is not required, a laminating adhesive which is both tinted and filled with reflective aluminum powder may be employed. In this case, the previously described layer of metallization may be omitted because its reflective function is replaced by the aluminum powder. This also will provide a colored product with an unusual appearance. The release coating may be any of the conventional release systems used on film tapes. These are described in U.S. Pat. Nos. 2,532,011 and 3,502,497, for example.

The adhesive of this invention is specially adapted to provide very good anchorage to the polyester film and at the same time exhibit a fine balance of properties, especially tack, and also will function well on the die-cutting and tab applying devices used to die-cut and apply the tape to the can lids. The tape must have the right level of tack in order to be functional. Too high a level of tack is undesirable since the adhesive will stick excessively to the dies and the tabs will be misplaced and even may cause machine jam-ups. Too low a level of tack will not provide adequate initial adhesion to the can lids and will result in an abnormal number of failures.

The following examples are given only by way of illustration and are not intended to limit the scope of the invention in any way. In the examples, all proportions are expressed in parts per one hundred parts by weight of the total elastomeric component unless otherwise indicated.

EXAMPLE I

A most suitable can sealing tape is made using a laminate consisting of two one mil thick polyethylene terephthalate films laminated toether with 0.2 oz./sq. yd. of a hot melt bonding adhesive which comprises a polyester polymer formed by the esterification of ethylene glycol and mixed phthallic acids such as terephthallic, metaphthallic or orthophthallic acids. One of the films is metallized by a standard high vacuum metallization process wherein a layer of aluminum having a standard resistance of one to two ohms per square foot is deposited on the film. The metallized surface is sandwiched between the two films. To the glossy surface of the resulting laminate is applied about 150 mg./sq. yd. (dry weight) of a solution of the release material described in U.S. Pat. No. 3,502,497, using an etched roll applicator. The opposite surface of the laminate is reverse roll coated with 3.3 oz./sq. yd. (wet weight) or 1.50 oz./sq. yd. (dry weight) of the following pressure-sensitive adhesive dissolved in toluene and diluted to 45 percent solids.

| Ingredient | Proportion |
|---|---|
| Kraton 1107 S-I-S copolymer | 50 |
| Kraton 1102 S-B-S copolymer | 50 |
| Wingtack 95 tackifier resin | 30 |
| Cumar LX-509 bonding resin | 20 |
| Beta meta cresol antioxidant | 2 |

This tape exhibits an adhesion to steel of 79 oz./in. of width. Adhesive strength or adhesion to steel is measured in ounces per inch of width by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure-Sensitive Tape Council.

Anchorage of the adhesive is 91 ozs. per inch of width measured by bonding the tape to a Bondex B-T-7 rug binding tape at 300° F. for 20 seconds and then measuring the force to strip the film from the adhesive using an Instron strain gauge tensile testing instrument at a pulling speed of 12 inches per minute and a stripping angle of 180°.

The tape of this example also exhibits a surprising improvement in puncture resistance and tear resistance when compared with prior art tapes. This is demonstrated by the following data wherein the backing laminate of Example I, i.e., the tape minus the adhesive and release coating layers, is compared with a prior art backing of substantially the same thickness which also lacks adhesive and primer on one side and protective coating on the other. This prior art is a 2.1 mil thick aluminum metallized polyethylene terephthalate which is only about 10 percent thinner than the 2.3-mil thick backing of Example I.

| Property | Example I Backing | Prior Art Backing |
|---|---|---|
| Thickness, mils | 2.3 | 2.1 |
| Tensile strength, lbs./in. width | 35.5 | 34.0 |
| Elongation, % | 41.0 | 39.0 |
| Puncture resistance, ounces | 22.4 | 12.8 |
| Tear resistance, ounces | 37.0 | 14.0 |

While the values for tensile strength and elongation are guite comparable, the puncture resistance and tear resistance for the Example I backing is in the order of twice that of the prior art backing. More precisely, the increase in puncture resistance is about 75 percent and the increase in tear resistance is about 165 percent. These results are indeed surprising.

Tensile strength in pounds per inch width and elongation in percent are determined in accordance with Test No. P.S.T.C. #31 of the Pressure-Sensitive Tape Council.

Puncture resistance is measured in ounces by the following test. A stirrup shaped yoke is provided with means at the top for clamping into the top jaw of the Instron testing instrument and a 1/16 inch diameter sharpened nail is welded to the bottom bar of the stirrup with its point extending upwardly toward the top of the stirrup. The test backing is cut into a 1 × 12 inch strip and draped over the point of the nail in such a way that it is centered transversely and longitudinally on the nail. Then, the top of the stirrup is clamped in the top jaw of the Instron instrument and the free ends of the sample are clamped in the bottom jaw of the instrument and the jaws are separated at a rate of 12 inches per minute. Puncture resistance is determined by recording the force in ounces at the time the nail punctures the test strip.

Tear resistance is measured in ounces by the following test. A jig is provided which consists of a 1/16 inch thick metal plate in the shape of an isoceles triangle having a height of 1.06 inches and equal sides 1.5 inches long pivotally attached to a bar extending at right angles through the apex of the plate in such a manner as to allow the triangle to swing freely. A ¼ inch diameter hole is punched in the center of the test backing strip and the rod is inserted through the hole before attaching the rod to the upper jaw of the Instron instrument. The two ends of the test backing are inserted in the lower jaw of the Instron machine and the force necessary to start tearing the film from the punched hole outwardly is measured in ounces by using an Instron pulling speed of 12 inches per minute.

EXAMPLES II–X

To study the effect of the Cumar and Piccotex bonding resins on anchorage to the backing laminate, the following pressure-sensitive adhesives are made up and coated on a release coated 1.5-mil polyester film at a dry coating weight of 1.5 oz./sq. yd. Adhesion to steel and anchorage are measured by the methods just described and the results are reported in Table A for Examples II–X together with the ratio of anchorage to adhesion for each example. These Examples illustrate the fact that the addition of Cumar or Piccotex bonding resin greatly increases anchorage and, to a lesser extent increases adhesion to steel. This is evidenced by comparing Examples II with Examples III–X. More importantly, the addition of these bonding resins definitely increases the ratio of anchorage to adhesion, which means that the adhesives containing these bonding resins are much less likely to delaminate or transfer from their backings when the tape is removed from an application surface.

TABLE-A

|  | II | III | IV | V | VI | VII | VIII | IX | X |
|---|---|---|---|---|---|---|---|---|---|
| Kraton 1107 S-I-S copolymer | 50 | 50 | 50 | 50 | 50 | 50 | 50 | 50 | 50 |
| Kraton 1102 S-B-S copolymer | 50 | 50 | 50 | 50 | 50 | 50 | 50 | 50 | 50 |
| Wingtack 95 tackifier resin | 30 | 30 | 30 | 30 | — | — | — | — | — |
| Piccolyte S-115 tackifier resin | — | — | — | — | 20 | 30 | 40 | 30 | 20 |
| Cumar LX-509 bonding resin | — | 20 | 30 | — | 20 | 20 | 20 | 30 | 30 |
| Piccotex 120 bonding resin | — | — | — | 30 | — | — | — | — | — |
| Beta meta cresol antioxidant | 2 | 2 | 2 | 2 | 2 | 2 | 2 | 2 | 2 |
| Adhesion to steel oz./in. width | 44 | 55 | 62 | 64 | 68 | 69 | 78 | 65 | 62 |
| Anchorage oz./in. width | 48 | 72 | 83 | 88 | 77 | 82 | 91 | 88 | 83 |
| Ratio, Anchorage/Adhesion | 1.09 | 1.31 | 1.30 | 1.29 | 1.13 | 1.19 | 1.17 | 1.35 | 1.34 |

In the foregoing examples Kraton 1107 block copolymer is a thermoplastic elastomeric A-B-A (styrene-isoprene-styrene) or S-I-S block copolymer of this invention offered by the Shell Chemical Company, wherein the styrene content (that of the S-blocks) is about 12–15 percent, closer to 15 percent by weight of the block copolymer, and the polymer possesses a solution viscosity of about 2,000 centipoises at 25 percent solids in toluene at room temperature (using a Brookfield Viscometer with a No. 4 spindle at 60 r.p.m.), and a number average molecular weight of about 110,000–125,000. Kraton 1102 copolymer is another A-B-A block copolymer offered by Shell but this is a styrene-butadiene-styrene or S-B-S copolymer wherein the styrene blocks constitute about 28–30 percent of the copolymer. The number average molecular weight of Kraton 1102 copolymer also is about 125,000.

Wingtack 95 tackifier resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon the percentage of units in each molecule having a double bond. The said resin is polymerized from a stream of aliphatic petroleum derivatives in the form of dienes and mono-olefins having 5 or 6 carbon atoms all in accordance with the general teachings of U.S. Pat. No. 3,577,398. The resin possesses a softening point of about 95° C. by the ball and ring method, a number average molecular weight of about 1100 and is offered commercially by Goodyear Tire and Rubber Company.

Cumar LX-509 bonding resin is a solid coumarone-indene copolymer resin offered by the Neville Chemical Co., and having a softening point of about 145° C. Piccotex 120 bonding resin is an alpha-methyl styrene-vinyl toluene copolymer offered by Hercules Chemical Co., with a melting point of 120° C.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive container sealing tape which comprises a backing laminate, a pressure-sensitive adhesive layer on one of the major surfaces of the laminate and a release coating on the other major surface of the laminate, said tape being wound upon itself to form a roll with the pressure-sensitive adhesive layer facing inwardly toward the axis of the roll; said laminate comprising a first polyester film and a second polyester film laminated to one another through a reflective inner layer which comprises either,
   (a) a thin layer of metal coated onto one major surface of said first film to metallize said surface and a laminating adhesive layer adhering the second film to the metallized surface of the first film, or
   (b) a laminating adhesive layer containing metallic reflective material and adhering said first and second films to one another;
said pressure sensitive adhesive layer consisting essentially of the following components the proportions of which are expressed in parts per one hundred parts by weight of the elastomeric component:
   (1) an elastomeric component comprising about 35–65 parts of each of S-I-S and S-B-S linear or radial thermoplastic and elastomeric block copolymers wherein the S-blocks are thermoplastic and are derived from styrene or styrene homologues and the I-blocks and the B-blocks are elastomeric and are derived from isoprene and butadiene, respectively;
   (2) about 20–50 parts of a relatively high melting point tackifier resin; and
   (3) about 10–35 parts of a relatively low molecular weight S-block associating bonding resin.

2. A pressure-sensitive container sealing tape according to claim 1, wherein said laminating adhesive is heat activatable.

3. A pressure-sensitive container sealing tape according to claim 2, wherein said laminating adhesive is applied as a hot melt.

4. A pressure-sensitive container sealing tape according to claim 2, wherein said laminating adhesive is a polyester hot melt adhesive.

5. A pressure-sensitive container sealing tape according to claim 4, wherein said first and second polyester films are of polyethylene terephthalate, and said polyester adhesive is based upon a polyester resulting from the esterification of ethylene glycol and phthallic acids.

6. A pressure-sensitive container sealing tape according to claim 1, wherein said tackifier resin has a melting point of at least about 90° C.

7. A pressure-sensitive container sealing tape according to claim 6, wherein said tackifier resin is a hydrocarbon resin.

8. A pressure-sensitive container sealing tape according to claim 1, wherein said bonding resin is selected from the group consisting of alpha-methyl styrene-vinyl toluene copolymers and coumarone-indene copolymers.

* * * * *